May 5, 1953  G. E. HAGEN  2,637,812
ELECTRONIC PULSE SPACER
Filed June 14, 1949  2 SHEETS—SHEET 1

INVENTOR:
GLENN E. HAGEN
By Herbert E. Metcalf
HIS PATENT ATTORNEY

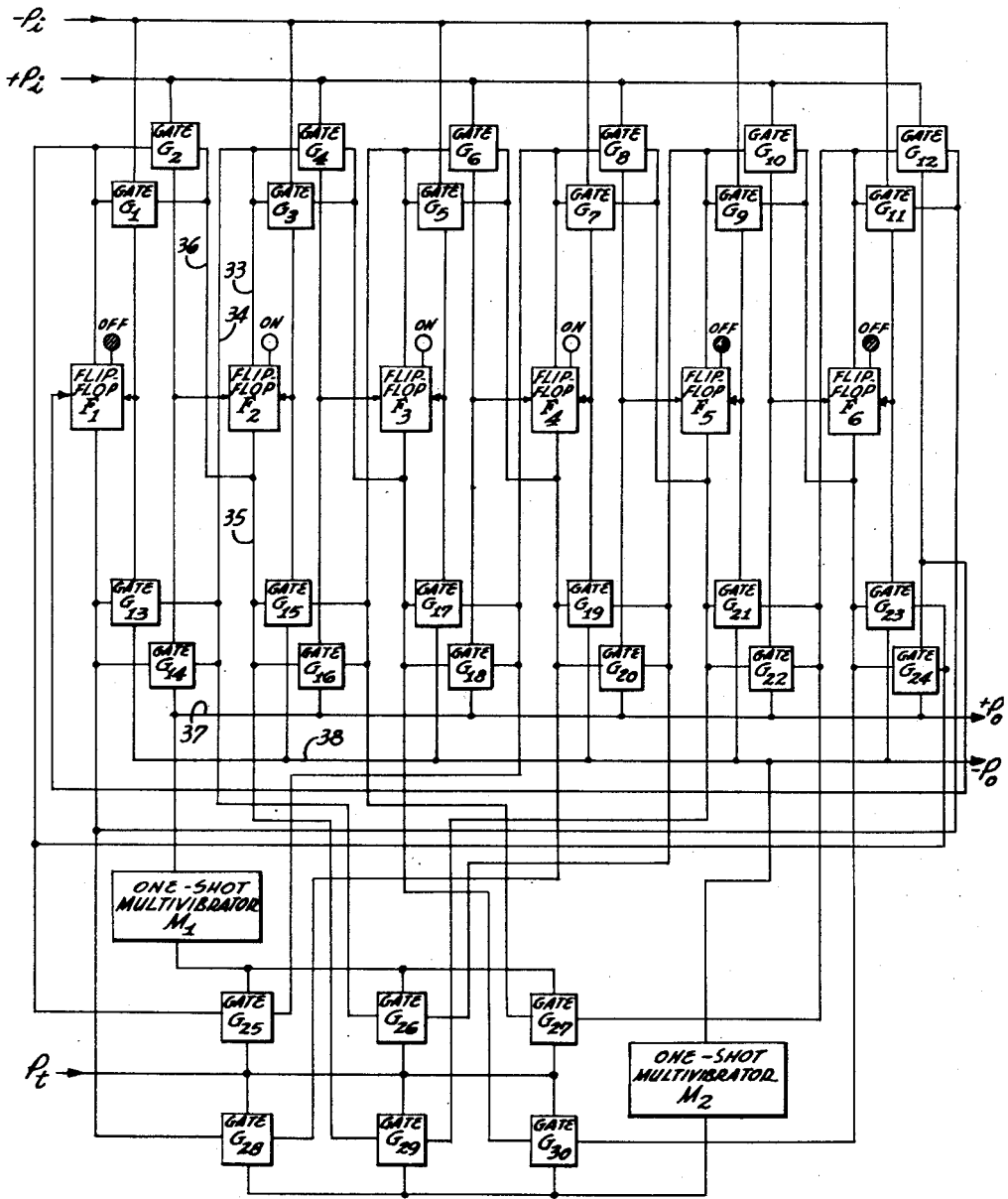

Patented May 5, 1953

UNITED STATES PATENT OFFICE 2,637,812

ELECTRONIC PULSE SPACER

Glenn E. Hagen, Lawndale, Calif., assignor to Northrop Aircraft, Inc., Hawthorne, Calif., a corporation of California Application June 14, 1949, Serial No. 99,092

19 Claims. (Cl. 250—27)

This invention relates to electronic pulse spacers, and more particularly to a means for reorienting pulses in accordance with a timed pulse source.

In digital computers, for example, it is sometimes desirable to use a serial process for transmitting numbers. Under these conditions a train of properly spaced pulses represents the numerical data. The time of arrival of these pulses on a common output line, as from a binary counter, for example, distinguishes the separate digits of the pulse train. In such a binary system of designation, since only two digits are required, the arrival of a pulse on the output line may represent a "one," and the absence of a pulse at a properly spaced interval may represent a "zero." Hence it is very important that the temporal spacing of these pulses, whether the spacing be one or several intervals, is well defined.

Furthermore, in order to get the highest possible speed out of a serial operation, it is desirable that the circuits be designed so that the numerical pulses may be generated to be spaced in intervals as close as permissible with existing electronic devices which must be able to discriminate between them. Thus even slight shifts of the pulses relative to each other must be eliminated since this would make them indistinguishable.

It is also desirable to properly position the pulses in order to synchronize the various units of the computer. Therefore, a time pulse source is usually provided for generating time pulses which synchronizes the computer by triggering and controlling the circuit operations.

However, although a time pulse is used to trigger the network that serially feeds a number from a binary counter, for example, the train of pulses representing the number do not always arrive on the output line properly spaced with respect to time due to the variable delay presented by the characteristics of the transfer network. This delay is a function of the number content of the counter and may be of such a magnitude that as many as two pulses may occur in the period of the time pulses.

Furthermore, variations in temperature and ageing of electronic equipment can render the delays, inherent in electrical equipment, to be variable in nature and hence not easily handled.

Consequently, there is need for a device such that when it is placed in an electric circuit that is passing pulses it will not only clearly recognize these closely spaced pulses but also reorient them according to the period of the timing pulses.

It is therefore an object of this invention to provide an electronic circuit for spacing poorly positioned input pulses so that they are fed out in synchronism with a timed pulse.

It is another object of this invention to provide means in an electronic spacing circuit for distinguishing input pulses when several occur within a period of the timing pulse.

It is another object of this invention to provide means for sensing both an input pulse and a timed pulse fed simultaneously into an electronic spacing circuit.

It is still another object of this invention to provide means in an electronic spacing circuit for sensing poorly spaced pulses on both a positive and negative input line and feeding them out as properly spaced pulses on positive and negative output lines.

It is yet another object of this invention to provide pulse spacing circuits which are admirably suited for use in anti-coincidence or coincidence devices.

In the following specification and claims, certain of the terms used are defined as follows:

1. *Flip-flop.*—A trigger circuit, usually a two tube electronic circuit with two stable states corresponding to conditions as to whether one tube or the other is conducting. The circuit is made to pass back and forth between the two stable states by the application of triggering pulses. A flip-flop circuit is usually provided with one or two outputs in which the condition of the connected tube can be sensed to determine the state of the circuit. Flip-flop circuits of the Eccles-Jordan type have been widely publicized for many years, and are suitable for use in the present invention.

2. *Gate.*—A trigger circuit, usually having a single tube operating either at unity gain or zero gain, depending on the value of a control or gating voltage. Gates may have several inputs arranged so that the output is stimulated only if all of the inputs are stimulated.

3. *One-shot multivibrator.*—An electronic trigger circuit having one absolutely stable state and one quasi-stable state. Under the influence of an applied trigger pulse the circuit passes from the stable state to the quasi-stable state. After a period of time, determined by circuit parameters, the circuit returns to the original stable state. A one-shot multivibrator can also be used as a pulse former, as the shape of its output pulse is constant irrespective of the shape of the triggering pulse.

All of the above defined circuits have been widely known in the electronic art for many years. An early reference is "Radar Electronic Fundamentals" (Navships 900,016), Navy Department, Washington, D. C., June 1944. (See section VII, special circuits.)

Briefly, this invention provides a pulse spacing circuit comprising a multistage counter-storage device. An input line feeds input pulses having a varying frequency into the counter; another input line feeds in timed pulses having a constant frequency. Each input pulse increases the number content of the counter by one. Each timed pulse releases one of the stored input pulses and simultaneously passes it on to the output. By designating the "zero" condition of the counter-storage device when a given number of consecutive stages is in the "on" condition, and by the use of appropriate gating circuits, means are provided which ensure that a time pulse does not arrive at the same stage simultaneously with an input pulse so that the stage cannot distinguish between them. This gating and arrangement also provides the means for storing more than one input pulse before a timing pulse is received. Other gating circuits are provided for permitting the pulse spacing circuit to store and release both negative and positive input pulses on separate lines.

This invention may be more fully understood by reference to the drawings, in which:

Figure 5 is a schematic wiring diagram of the preferred embodiment of the invention.

Figure 1:
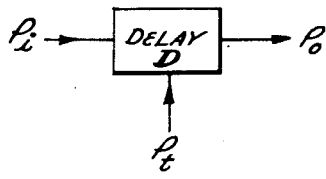
Figure 1 is a diagrammatic, general, functional embodiment of the invention.

Referring first to Figure 1, the drawing indicates, generally, how a pulse spacing device operates. D is a storage-delay device. $P_i$ is the pulse input line into the device carrying the pulses that are poorly spaced due to variable delays in the preceding circuitry. $P_t$ is the timing pulse input line feeding pulses from a central source called a clock (not shown).

Here a pulse arriving at $P_i$ remains in delay D until a pulse from $P_t$ releases it to pass on to the output line $P_o$. Since $P_t$ is fed from a constant frequency pulse source, the output pulses at $P_o$ occur at the points in time defined by the timed pulses $P_t$.

The simple device as shown in Figure 1 does not, however, solve the difficulties of more than one pulse arriving at $P_i$ before a pulse arrives at $P_t$; and the simultaneous arrival at D of a pulse from $P_i$ and $P_t$.

Figure 2:
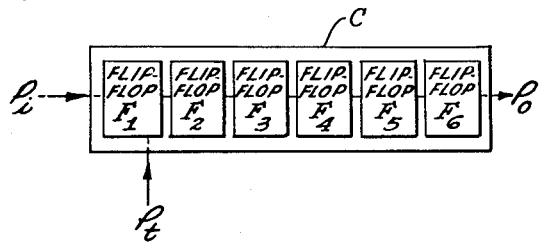
Figure 2 illustrates the counting-storage action of the invention.

The device of Figure 2 solves one of the shortcomings of the device of Figure 1 by replacing the single stage storage device D with a multi-stage counter-storage device C having flip-flop stages $F_1$ through $F_6$. The term flip-flop as used herein refers to any electrical circuit having the properties such that it has two stable states and can be triggered from one state to the other by means of an input pulse. In this flip-flop circuit, the stable states correspond to conditions that can be sensed, for instance, as the energizing of one line or another. Each input pulse applied to the flip-flop triggers it to energize the opposite line. The flip-flop stages $F_1$ through $F_6$ are not connected together so as to have interstage carry pulses as is common in a binary counter, for instance, but rather in a manner as will be explained in the ensuing description. In effect, the counter operates in a unitary fashion, each input pulse at $P_i$ increases the number content of the counter C by one, and each timing input pulse at $P_t$, if the counter content is greater than zero, decreases the number content of the counter by one and transmits, simultaneously, a pulse to $P_o$. This means permits more than one input pulse to be fed into the counter C during a single period of the time pulses. These input pulses are then stored and released to the output as the time pulses arrive. This device still provides no solution to the difficulty that arises when a pulse in $P_i$ and $P_t$ arrive at counter C simultaneously.

Figure 3:
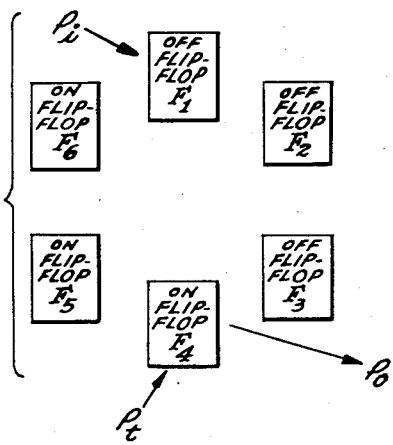
Figure 3 illustrates the ring-counting-storage action of the invention.

Consider next the device illustrated in Figure 3.

It will be noticed here that the six flip-flop stages are here arranged in a circular array and illustrate the ring-counting-storage action of the invention. The actual connecting circuitry between the stages, not shown here since only the principle is being introduced, is clearly described later in connection with Figure 5.

It is noticed in Figure 3 that flip-flop stages $F_4$, $F_5$ and $F_6$ are "on" and flip-flop stages $F_1$, $F_2$, and $F_3$, and "off." The state of three consecutive stages of the counter being "on" represents the "zero" state of the counter for a reason which will be explained hereafter. The connection circuitry between the flip-flop stages is such that an input pulse on $P_i$ is so routed that it always increases the content of the counter by turning "on" the next flip-flop, after the last flip-flop that is "on," in a clockwise direction. While a timing input pulse on $P_t$ is so routed that it always turns "off" the last flip-flop, in a counterclockwise direction, that is "on." Hence in the case illustrated, the next input pulse on $P_i$ will turn "on" $F_1$ and the next timing input pulse $P_t$ will turn "off" $F_4$. An output pulse is transmitted on output line $P_o$ whenever a time pulse at $P_t$ turns a flip-flop to the "off" condition.

Figure 4:
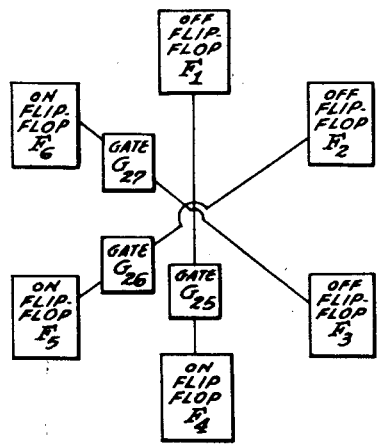
Figure 4 shows the gating action between opposite pairs of counting stages.

Since, as as has been stated above, it is desired that three of the flip-flop stages be "on" for the "zero" condition of the counter, a means must be provided for preventing the timing pulses $P_t$ from decreasing or turning to an "off" condition more than three flip-flops. Actually, as will be explained in the detailed description of the actual circuit of the preferred embodiment of the invention in Figure 5, the introduction of negative input pulses can reduce the number of "on" flip-flops to as low as one. Nevertheless, when considering positive input pulses alone, Figure 4 illustrates the principle for preventing timing pulses from being felt on the stages and the output line when the counter registers "zero." As shown, gates $G_{25}$, $G_{26}$ and $G_{27}$ are connected between opposite flip-flop stages. These gates control the timing input pulses $P_t$. All of the gates are closed until two opposite flip-flops are "on"; then the gate, connecting these opposite flip-flops, opens and allows input timing pulses $P_t$ to operate, i. e., turn "off" the last flip-flop that is "on" in a counter-clockwise direction. It will be noted by reference to Figure 4 that at least four consecutive flip-flops must be "on" before operation by positive input timing pulses $P_t$ can occur. Thus it is obvious that both a pulse from $P_i$ and a pulse from $P_t$ cannot be applied simultaneously to the same flip-flop.

Referring next to Figure 5, a schematic wiring diagram of the preferred embodiment of the invention is shown. As will be noted this embodiment includes the principal features of advantage illustrated in Figures 2, 3, 4.

Here flip-flops $F_1$ through $F_6$ each represent a stage of the counter-delay, but as previously pointed out, no carry pulses are transmitted between stages. It is to be appreciated here that although the flip-flop stages are positioned in a row, their electrical connections, in effect, give the stages the endless ring-counting-action illustrated in Figure 3, i. e., $F_6$ is followed by $F_1$.

Input pulse gates $G_1$ through $G_{12}$ positioned above the flip-flop stages in Figure 5 are the input pulse $P_i$, control gates. The odd number subscripts, in this group, denote the negative input pulse control gates and the even number subscripts denote the positive input pulse control gates. These gates, dependent on which of the sets is open, enable a positive or negative input pulse $P_i$ to pass therethrough directly to one of the flip-flop stages to change its state, as is well known.

Directly below the flip-flop stages $F_1$ through $F_6$ a second grouping of gates $G_{13}$ through $G_{24}$ is provided. These gates control the timing pulse input $P_t$ to the flip-flop stages. As before, the odd number subscript designation represents the negative timing pulse input control gates; and the even number subscript designation represents the positive timing pulse input control gates. The significance of a positive and negative timing pulse will be explained in the ensuing discussion.

At the lower portion of Figure 5 a third group of gates is provided comprising two rows with three gates in each row. The upper row of gates $G_{25}$, $G_{26}$, $G_{27}$ may be designated as the positive interconnecting gates, and the lower row $G_{28}$, $G_{29}$, $G_{30}$ as the negative interconnecting gates. As explained in connection with Figure 4, these gates define the "zero" state of the stages making up the storage delay.

In order to further describe the circuit, it must first be established that whenever the upper vertical line leading from a flip-flop is energized, the flip-flop is considered in an "on" condition; and whenever the lower vertical line of a flip-flop is energized the flip-flop is considered in an "off" condition. Further, in all instances, the horizontal lines to the gates are the control lines and the vertical lines to the gates are the input and output lines.

Thus it is shown in Figure 5 that positive input pulse line $+P_i$ is connected to the left horizontal input line of each of the flip-flop stages $F_1$–$F_6$ through respective positive input gates $G_{12}$, $G_2$, $G_4$, $G_6$, $G_8$, $G_{10}$; and negative input pulse line $-P_i$ is connected to the right horizontal input line of each of the flip-flop stages $F_1$–$F_6$ through respective negative input gates $G_1$, $G_3$, $G_5$, $G_7$, $G_9$, $G_{11}$.

It is next to be described in detail how the gating action of the gates $G_1$ through $G_{12}$ is obtained so that the desired flip-flop is operated upon by either a positive or negative input pulse $P_i$.

As can be noted in Figure 5, the potential of the "on" condition of each flip-flop is connected, as for instance, line 33 from $F_2$, to the left control lines on each of two input pulse gates above and to the right of the flip-flop, such as $G_3$ and $G_4$. This same potential is also connected, in each case, by a line like line 34 to the right control lines on each of two timing pulse input gates, such as gates $G_{13}$ and $G_{14}$, below but in this case to the left of the flip-flop.

Likewise, the lower vertical line of each flip-flop or the potential of the "off" condition, as for instance line 35 of $F_2$, is connected so that the potential thereon is impressed by a line, such as line 36, onto the right control line of each of two input pulse gates, in this case $G_1$ and $G_2$, above and to the left of it. This same potential is also connected, in each case, to the left control lines on each of the two timing pulse gates, in this case $G_{15}$, and $G_{16}$, below and to the right of the flip-flop.

It is now further established that both the horizontal control lines to a gate must be energized; that is of a high potential, before the gate is opened.

Thus it is made clear by the above, that in order for a pair of the input pulse gates to be opened, the "on" condition of the flip-flop connecting to its left control lines must be energized; and the "off" condition of the adjacent flip-flop connecting to its right control line must be energized.

It is further now made clear that one of the pair of open input pulse gates connects the positive input line, $+P_i$, to the "off" flip-flop and the other of the open gates connects the negative input line, $-P_i$, to the "on" flip-flop. Thus depending on which of the input lines has a pulse, the counter either adds or subtracts by "one." Thus the previous requirement that the positive input pulse $P_i$ be permitted to turn "on" the first flip-flop that is "off," and no other, as the stages are traversed from left to right is met. It should be noted that as soon as the input pulse, $P_i$, has been recorded in the counter, the potentials on the control lines of the input pulse gates change so that the pair of input pulse gates to the right or to the left of the pair previously open are now open, depending, as noted, on whether a positive or negative input, $P_i$, pulse had been received.

This completes the description explaining how a positive or negative input pulse is controlled by the pulse input gates so as to increase or decrease the number content of the counter-storage in the desired fashion.

It will now be described in detail how the timing pulses $P_t$, are fed into the counting storage circuit to release a previously stored input pulse $P_i$ and feed out simultaneously a pulse to the output $P_o$.

As has been stated, the group of interconnecting gates $G_{25}$ through $G_{30}$ control the timing pulses $P_t$. It should be noted first that all three positive interconnecting gates $G_{25}$, $G_{26}$, and $G_{27}$ are connected in parallel so that any one of them could pass a timing pulse from $P_t$ into the circuit. When any one of these positive interconnecting gates is open the indication is that the counter-delay is storing positive input pulses, hence a timing pulse, $P_t$, is permitted to pass into the circuit to decrease the number content of the counter-delay by turning "off" the first stage of the "on" stages from the left in Figure 5.

On passing through one of the positive interconnecting gates the timing pulse tends to become distorted so that it is routed through a one shot multivibrator $M_1$ which reconditions the pulse to its original shape before it passes onto a positive bus line 37. Positive bus line 37 is connected to the left horizontal input line of each of the flip-flop stages $F_1$, $F_2$, $F_3$, $F_4$, $F_5$, $F_6$, through positive timing pulse input gates $G_{24}$, $G_{14}$, $G_{16}$, $G_{18}$, $G_{20}$, $G_{22}$, respectively. But as will be more clearly brought out later, only one of these gates will be open, that gate being the one which leads to the first flip-flop that is "on" after the flip-flops that are "off" traversing the stages from the left. As will be noted, the positive bus line 37 terminates at the right of Figure 5 as the output pulse line $+P_o$. Thus simultaneously with decreasing the number content of the counter-delay by one, a pulse is fed to the output line $+P_o$.

In a similar manner, whenever one of the negative interconnecting gates $G_{28}$, $G_{29}$, $G_{30}$ are open, this indicates that the counter is storing negative pulses; that is, the counter has less than three consecutive flip-flops in the "on" condition, which is the "zero" state of the counter-storage. Hence a timing pulse can pass through one of the gates $G_{28}$, $G_{29}$, $G_{30}$, then through a second one-shot multivibrator $M_2$ which restores the pulse to its original shape prior to its being impressed on a negative bus line 38. This negative bus line 38 is connected to the right horizontal input line of each of the flip-flop stages $F_1$, $F_2$, $F_3$, $F_4$, $F_5$, $F_6$ through negative timing pulse input gates $G_{13}$, $G_{15}$, $G_{17}$, $G_{19}$, $G_{21}$, $G_{23}$, respectively. But since only one of these gates can be open at any given time, the timing pulse, now operating on a counter storing a negative number, adds one to the counter by turning "on" the last flip-flop stage in the group of flip-flops that are "off," traversing the stages from the left. Since the negative bus line 38 is directly connected to the negative pulse output line, $-P_o$, a negative output pulse is generated simultaneously with the adding of one to the counter-storage.

It will now be more clearly explained in detail how the timing input gates $G_{13}$ through $G_{24}$ permit the desired flip-flop to be operated upon by the timing pulse $P_t$ impressed on either the positive or negative bus lines 37, 38, respectively.

In a manner analogous to the control of the pulse input gates, each of the timing input gates $G_{13}$ through $G_{24}$ has its left and right control lines directly connected to the "off" condition of one flip-flop and the "on" condition of the next higher flip-flop, respectively. Hence, as previously explained, the pair of gates that are opened to permit the timing pulse to cancel, or add for negative operation, a number in the storage are the ones that control the input lines to the adjacent flip-flops which are in such a condition that an "off" flip-flop is followed by an "on" flip-flop when traversing the stages toward the right. Furthermore, the negative bus line 38 is connected through one of the open gates to the flip-flop that is "off" and the positive timing pulse input is connected through the other open gate to the flip-flop that is "on." Thus it is made clear that a negative timing pulse increases the counter content by one and a positive timing pulse decreases the counter content by one.

It will next be made clear how the "zero" state of the counter automatically controls the timing pulses so that they can be properly routed to either subtract or add a one from the counter, and also feed the output pulse, $P_o$, to the proper output line.

As will be noted in Figure 4, the opposite flip-flops of the array there shown are interconnected by a gate. On referring to Figure 5 it is noted that gates $G_{25}$, $G_{26}$, and $G_{27}$ are here connected to the same flip-flop stages as shown in Figure 4. Their horizontal control lines in each case are impressed by the potential of the "on" condition of the flip-flops. It is now apparent as previously stated that in order for one of the interconnecting gates $G_{25}$, $G_{26}$, $G_{27}$, to open, four consecutive stages must be in the "on" condition. If five consecutive stages are "on," as when two input pulses are received during the period of the timing pulse, the result is merely that two timing pulses can be passed through the interconnecting gates before they are both closed, that is, providing no positive input pulses have been, in the meantime, fed into the counter.

On the other hand, the interconnection gates $G_{28}$, $G_{29}$, and $G_{30}$, have their horizontal control lines connected so as to be impressed by the "off" condition potentials of opposite flip-flops. That is, the "off" potential of $F_1$ and $F_4$ are connected to control gate $G_{28}$; $F_2$ and $F_5$ to control gate $G_{29}$; and $F_3$ and $F_6$ to control gate $G_{30}$. Thus, at least four consecutive flip-flops must be energized in the "off" condition before a negative interconnection gate will open; or, in other words, only one or two consecutive flip-flops are energized in the "on" condition. Thus by the use of six stages, as with positive input pulses, two negative input pulses can be stored in the counter during the period of the timing pulse.

It will be understood now how the positive and negative input pulses which are stored in the counter-delay are cycled out as properly spaced pulses in synchronism with the timing pulses. It will also be evident from the above how either a positive or negative input pulse can be stored and subsequently released by timing pulses while still preserving its sign.

In operation, initially three consecutive stages of the counter-storage circuit are placed in an "on" condition. For example, assume that stages $F_2$, $F_3$, and $F_4$ of Figure 5 are in an "on" condition. Since stage $F_4$ is "on" and stage $F_5$ is "off" both horizontal control lines of input pulse control gates $G_7$ and $G_8$ will be energized and hence these gates will be open. Assume that the next input pulse is at $+P_1$. This input pulse will pass through input gate $G_8$ and turn stage $F_5$ "on."

Assume again that another pulse arrives from $+P_1$; and, since gate $G_{10}$ is now open, this pulse turns $F_6$ "on." Thus two $+P_1$ input pulses have been received and stored in the counter storage increasing its number content by two.

The constant timing pulse frequency at $P_t$, for this particular embodiment of the invention, must be established high enough so that not more than two pulses at $+P_1$, or $-P_1$, will arrive before a pulse at $P_t$. Hence the next input pulse into the counter-storage, in the above case, would have to be a timing pulse through $P_t$.

The connections of the control lines of positive interconnection gates $G_{26}$ and $G_{27}$ are such that they are energized by the "on" conditions of $F_2$, $F_5$; and $F_3$, $F_6$, respectively. Thus a timing pulse $P_t$ is permitted to pass through the open gates, to the one-shot multivibrator $M_1$ and thence to the positive bus line 37. For this case, timing pulse input gates $G_{13}$ and $G_{14}$ are both open since stage $F_2$ is "on" and stage $F_1$ is "off"; thus the timing pulse $P_t$ passes from positive bus line 37 through $G_{14}$ to turn stage $F_2$ "off."

Summarizing the above operation, a pulse from $+P_1$ has turned stage $F_5$ "on," another pulse from $+P_1$ has turned stage $F_6$ "on," and a timing pulse from $P_t$ has turned stage $F_2$ "off" and simultaneously transmitted a pulse to $+P_o$.

To describe the operation of the storage and release of negative input pulses $-P_1$, assume again that the initial conditions are: $F_2$, $F_3$, and $F_4$ stages are "on." It follows that input pulse gates $G_7$ and $G_8$ are open, thus an input pulse from $-P_1$ passes through gate $G_7$ to turn stage $F_4$ "off." Negative interconnecting gate $G_{28}$ is open for this case, since both stages $F_1$ and $F_4$ are "off," and a timing pulse from $P_t$ is thus permitted to pass through $G_{28}$. This timing pulse activates pulse former $M_2$ and arrives at the negative bus line 38. Since stage $F_2$ is "on" and stage $F_1$ is "off," gates $G_{13}$ and $G_{14}$ are open.

The pulse thus passes through $G_{13}$ to turn stage $F_1$ "on" and also passes to output line $-P_o$. When stage $F_1$ goes "on," negative interconnecting gate $G_{28}$ closes. Since all the other interconnecting gates, both positive and negative are likewise closed, any additional timing pulses received from $P_t$ will not be passed into the circuit and, under these conditions, the output from the counter-storage circuit ceases.

Generalizing the operation of the invention, it is thus seen that the counter-storage stages $F_1$ through $F_6$ act as a storage for the poorly spaced input pulses $P_1$, until timing pulses $P_t$ from a clock source arrive to eliminate one pulse from the storage and pass one properly oriented pulse to the output $P_0$. The action of gates $G_{25}$ through $G_{30}$ is to cause the counting stages to count out in a forward or backward direction depending on whether the input pulses $P_i$ are predominantly additive or subtractive.

It should be pointed out that by use of two such electronic spacing circuits, as shown in the preferred embodiment of the invention, a very accurate and reliable coincidence device can be obtained. For instance, assume that one of these circuits were placed in each of two lines transmitting pulse trains to a common junction. Since the same timing pulse source can feed out pulses from both circuits, a very high degree of coincidence could be obtained at the junction.

Further, if it were desired that the two pulse trains pass into the common junction without coincidence, one of these pulse spacing circuits could be placed in each line to the junction but two timed pulses, properly phased for anti-coincidence, could be supplied to each of the circuits.

It is noted that this invention should not be limited to the storing of only two input pulses during the period of the timing pulse, since by having, say, 8 flip-flop stages and connecting the control lines of the interconnecting gates so that the "zero" of the counter is obtained when four consecutive stages are "on," means have been made available for storing three input pulses during the period of the timing pulse. This spacing circuit can be, in a similar manner, adapted to store any number of input pulses during the period of the timing pulse.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. An electronic pulse spacing circuit comprising a plurality of flip-flop stages connected in a closed array, a pulse source, a relatively high voltage from said pulse source representing a positive pulse, a relatively low voltage from said pulse source representing a negative pulse, a first input line for introducing said positive pulses to said flip-flop stages, said first input line being connected to a first set of individual gate circuits, each of the individual gate circuits in the first set being connected to a certain one of said flip-flop stages, said first set of individual gate circuits connecting said first input line and said flip-flop stages permitting each of said input pulses to be stored in one of said flip-flop stages, a second input line for introducing said negative pulses to a second set of individual gate circuits, each of the individual gate circuits in the second set being connected to a certain one of said flip-flop circuits, said second set of individual gate circuits connecting said second input line and said flip-flop stages permitting each of said negative pulses on said second input line to be stored in one of said flip-flop stages, a source of uniformly timed pulses connected to each of said flip-flop circuits, the effect of each said timed pulses being to eliminate one of said positive pulses or one of said negative pulses from storage, a first output line connected to said second input line and to each of said first set of individual gate circuits and to said flip-flop stages to convey out positive pulses in accordance with said positive pulses on said first input line and with said uniformly timed pulses, a second output line connected to each of said second set of individual gate circuits to pass negative pulses in accordance with said negative pulses on said second input line and with said uniformly timed pulses.

2. An electronic pulse spacing circuit comprising a plurality of flip-flop circuits connected in a closed array, a first input line conveying non-uniformly spaced pulses to said flip-flop stages, first gating means connecting said first input line and said flip-flop stages for permitting each of said input pulses to be stored in one of said flip-flop stages, a second input line for introducing timing pulses from a clock source, a second gating means connecting said second input line and said flip-flop stages and connected to said second input line and to said flip-flop circuit for permitting each of said timing pulses to cancel the storage of one of said input pulses in a flip-flop circuit, an output line connected to said second input line and to said gating means and to said second gating means to pass out a pulse in synchronism with each cancellation of an input pulse by said timing pulse.

3. An electronic pulse spacing circuit comprising a unitary counter having a plurality of flip-flop circuits connected in a closed array, a first input line feeding in input pulses for said flip-flop stages, first gating means connecting said first input line and said flip-flop stages to provide for the storage of said input pulses in said counter by the actuation of a flip-flop circuit, a second input line for introducing timed pulses, a second gating means connecting said second input line and said flip-flop stages and connected to said second input line to provide for the removal from storage of said input pulses by the actuation of the flip-flop circuits to their original state, an output line connected to said second input line and to said gating means to pass an output pulse each time a timed pulse actuates a flip-flop circuit.

4. An electronic pulse spacing circuit comprising a plurality of flip-flop stages connected in a closed array, a first input line carrying non-uniformly spaced pulses to said flip-flop stages, first gating means connecting said first input line and said flip-flop stages for permitting each of said input pulses to actuate a successive flip-flop circuit to an "on" condition, a second input line carrying timed pulses from a pulse source, a second gating means connecting said second input line and said flip-flop stages and connected to said second input line for permitting each of said timed pulses to actuate a successive flip-flop circuit into an "off" condition, an output line connected to said second input line and to said gating means to pass an output pulse each time a timed pulse triggers a flip-flop to an "off" configuration.

5. Apparatus in accordance with claim 4 wherein means are provided for keeping a fixed number of successive flip-flop stages in an "on"

condition, whereby each pulse on said input line triggers on an additional flip-flop adjacent to said successive flip-flops, and whereby each time pulse on said second input line triggers off the first of said successive flip-flops.

6. Apparatus in accordance with claim 4 wherein said gating means are controlled by the potentials on said flip-flop stages.

7. An electronic pulse spacing circuit comprising a unitary counter having a plurality of flip-flop stages connected in circular array, a positive input line for introducing positive pulses, positive gating means connecting said positive input line and said flip-flop stages for permitting each of said positive input pulses to increase the number content of said counter by the operation of a stage, a negative input line feeding in negative pulses, negative gating means connecting said negative input line and said flip-flop stages for permitting each of said negative pulses to decrease the number content of said counter by the operation of a stage, a timing input line feeding in timing pulses, gating means connecting said timing input line and said flip-flop stages for permitting said timing pulses to decrease the number content of said counter by the operation of a flip-flop after a positive input pulse has been received and to increase the number content of said counter by the operation of a flip-flop after a negative input pulse has been received, and means interposed to said gating means and said timing input line whereby an output pulse is fed to a positive output line when said timing pulse decreases the number content of said counter and an output pulse is fed to a negative output line when said timing pulse increases the number content of said counter.

8. An electronic pulse spacing circuit comprising a unitary counter having a plurality of flip-flop stages connected in circular array, wherein a fixed number of successive flip-flop stages can be initially placed in an "on" condition, a first input line feeding in pulses, gating means connected to said first input line to permit an input pulse to actuate on an "off" flip-flop following an "on" flip-flop, a second input line feeding in time pulses, a second gating means connecting said second input line and said flip-flop stages for permitting a timed pulse to operate an "on" flip-flop following an "off" flip-flop, an output line connected to said second gating means to pass an output pulse each time a timed pulse operates an "on" flip-flop, and a third gating means interposed between said second input line and said second gating means to control the timing pulse whereby said timed pulse can only operate a flip-flop when more than the fixed number of successive stages is in an "on" condition.

9. An electronic pulse spacing circuit comprising a unitary counter having six flip-flop stages connected in a circular array, wherein three successive stages of said counter can be initially placed in an "on" condition, a first input line feeding in pulses, gating means connecting said first input line and said flip-flop stages for permitting each of said input pulses to actuate an additional adjacent flip-flop into an "on" condition, a second input line feeding in timing pulses from a clock source, a second gating means connecting said second input line and said flip-flop stages for permitting each of said timing pulses to actuate the first of said successive flip-flops into an "off" condition, an output line connected to said second gating means to pass an output pulse each time a timing pulse actuates a flip-flop to an "off" configuration, a third gating means interposed between said second input line and said second gating means to control said timing pulse whereby said timing pulse can only actuate a flip-flop into an "off" condition when at least four consecutive flip-flops are "on."

10. Apparatus in accordance with claim 9 wherein said third gating means provides two input pulses for actuating two additional flip-flops into an "on" condition in the period of the timing pulses.

11. An electronic pulse spacing circuit comprising a unitary counter having a plurality of flip-flop stages connected in circular arrays, wherein an initial storage of a fixed number can be placed in successive stages of said counter, a positive input line for introducing positive pulses, positive input gating means connecting said positive input line and said flip-flop stages for permitting each of said positive input pulses to provide a unitary increase in the number content of said counter, a negative input line feeding in negative pulses, negative input gating means connecting said negative input line and said flip-flop stages for permitting each of said negative input pulses to provide a unitary decrease in the number content of said counter, a timing input line feeding in timing pulses, a positive output line, a negative output line, positive timing gating means connecting said timing input line with said flip-flop stages and said positive output line for permitting said time pulses to decrease the number content of said counter and feed a positive pulse to said positive output line if the number content of said counter is above the initial fixed number, negative time gating means connecting said timing input line with said flip-flop stages and said negative output line for permitting said time pulses to increase the number content of said counter and feed a negative pulse to said negative output line if the number content of said counter is below the initial fixed number.

12. Apparatus in accordance with claim 11 wherein all said gating means comprise gates with two control lines.

13. Apparatus in accordance with claim 11 wherein all said gating means comprise gates with two control lines, and both said control lines must be energized to open said gate.

14. Apparatus in accordance with claim 11 wherein all said gating means have their gates controlled by the potentials of said flip-flop stages.

15. An electronic pulse spacing circuit comprising a unitary counter having a plurality of flip-flop stages connected in circular array, wherein an initial storage of a fixed number can be placed in successive stages of said counter, a positive input line for introducing positive pulses, positive input gating means connecting said positive input line and said flip-flop stages for permitting each of said positive input pulses to provide a unitary increase in the number content of said counter, a negative input line for feeding in negative pulses, negative gating means connecting said negative input line and said flip-flop stages for permitting each of said negative input pulses to provide a unitary decrease in the number content of said counter, a timing input line for introducing time pulses, a positive timing line, positive interconnecting gating means for connecting said timing input line to said positive timing line if said counter has more than said fixed number stored therein, positive timing gates connecting said positive timing line and said flip-flop stages for permitting a timing pulse to decrease the number content of said counter and said flip-flop stages, a negative timing line, negative interconnecting gating means for connecting said timing input line to said negative timing line if said counter has less than said fixed number stored therein, negative timing gates connecting said negative timing line and said flip-flop stages for permitting a timing pulse to increase the number content of said counter, a positive output line connected to said positive timing line to provide a positive output pulse every time that a timing pulse passes through said positive interconnecting gates, a negative output line connected to said negative timing line to provide a negative output pulse every time that a timing pulse passes through said negative interconnecting gates.

16. Apparatus in accordance with claim 15 wherein said positive interconnecting gates are controlled by the "on" potentials of said flip-flop stages, and said negative interconnecting gates are controlled by the "off" potentials of said flip-flop stages.

17. Apparatus in accordance with claim 15 wherein pulse forming circuits are provided to restore said timing pulses to their original shape after passing through said interconnecting gates.

18. An electronic pulse spacing circuit comprising a unitary counter having six flip-flop stages connected in a circular array, wherein three successive stages of said counter can be initially placed in an "on" condition and the other stages in an "off" condition, an input line feeding in pulses irregularly spaced in time, six input pulse gates, each of said input pulse gates connecting said input line to one of said flip-flops, each of said input pulse gates having two control lines, one of said control lines connected to be energized by an "on" condition of a flip-flop and the other of said control lines connected to be energized by an "off" condition of an adjacent flip-flop whereby the only input pulse gate that is open is the one that is connected to an "on" flip-flop followed by an "off" flip-flop, said latter input pulse gate opening to an "off" flip-flop, a second input line feeding in timing pulses, a bus line, three interconnecting gates in parallel connecting said second input line to said bus line, each of said interconnecting gates having two control lines, each of said latter control lines connected to the "on" potentials of one of said flip-flops and another flip-flop three additional stages away, six timing pulse gates, each of said timing pulse gates connecting said bus line to one of said flip-flops, each of said timing pulse gates having two control lines, one of said latter control lines being energized by an "off" condition of a flip-flop and the other of said control lines being energized by an "on" condition of an adjacent flip-flop, whereby the only time pulse gate that is open is the one that is controlled by an "off" flip-flop followed by an "on" flip-flop, said latter timing pulse gate opening to an "on" flip-flop, and an output line directly connected to said bus line.

19. An electronic pulse spacing circuit comprising a unitary counter having six flip-flop stages connected in a circular array, wherein three successive stages of said counter can be initially placed in an "on" condition, a positive pulse input line, a negative pulse input line, six positive input pulse gates, each of said positive input pulse gates connecting said positive input line to one of said stages, six negative input pulse gates, each of said negative input pulse gates connecting said negative input line to one of said stages, each of said input pulse gates having two control lines, one of said control lines of each of said positive gates and one of said control lines of each of said negative gates connected to be energized by an "on" condition of the same flip-flop and the other of said control lines on both said latter positive and negative gates connected to be energized by an "off" condition of the same adjacent flip-flop, whereby the only pair of positive and negative gates that are open at any one instant are the ones that are connected to an "on" flip-flop followed by an "off" flip-flop, said negative gate opening to said "on" flip-flop and said positive gate opening to said "off" flip-flop, a timing input line feeding in timing pulses, a positive bus line, a negative bus line, three positive interconnecting gates in parallel connecting said time input line to said positive bus line, three negative interconnecting gates in parallel connecting said timing input line to said negative bus line, each of said interconnecting gates having two control lines, each of said positive interconnecting gates having each of their control lines connected to the "off" potential of one flip-flop and another flip-flop three additional stages away, each of said negative interconnecting gates having their control lines connected to the "off" potential of one flip-flop and another flip-flop three additional stages away, six positive timing pulse gates, each of said positive timing pulse gates connecting said positive bus line to one of said stages, six negative timing pulse gates, each of said negative timing pulse gates connecting said negative bus line to one of said stages, each of said time pulse gates having two control lines, one of said control lines of each of said positive time pulse gates and one of said control lines of each of said negative timing pulse gates connected to "off" condition on the same flip-flop and the other of said control lines on both said positive and negative timing pulse gates connected to an "on" condition of the same adjacent flip-flop, whereby the only pair of positive and negative timing pulse gates that are open at any one instant are the ones that are connected to an "off" flip-flop followed by an "on" flip-flop, said negative timing pulse gate opening to said "off" flip-flop and said positive timing pulse gate opening to said "on" flip-flop, a positive output line connected directly to said positive bus line, and a negative output line connected directly to said negative bus line.

GLENN E. HAGEN.

References Cited in the file of this patent

UNITED STATES PATENTS

| Number | Name | Date |
| --- | --- | --- |
| 2,158,285 | Koch | May 16, 1939 |
| 2,369,662 | Deloraine et al. | Feb. 20, 1945 |
| 2,443,198 | Sallach | June 15, 1948 |
| 2,462,896 | Ransom | Mar. 1, 1949 |
| 2,476,303 | Kalfaian | July 19, 1949 |

OTHER REFERENCES

"The Eniac," by M. V. Wilkes, April 1947, Electronic Engineering, pages 105 to 108.

"Digital Computor Switching Circuits," by C. H. Page, pages 110 to 118 of Electronics, September 1948.